US012783351B2

(12) United States Patent
Kern et al.

(10) Patent No.: US 12,783,351 B2
(45) Date of Patent: Nov. 3, 2026

(54) ERROR CORRECTION

(71) Applicant: Infineon Technologies AG, Neubiberg (DE)

(72) Inventors: Thomas Kern, Aschheim (DE); Alexander Klockmann, Taufkirchen (DE); Michael Goessel, Mahlow (DE); George Alkhoury, Munich (DE)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 18/910,131

(22) Filed: Oct. 9, 2024

(65) Prior Publication Data

US 2026/0099406 A1 Apr. 9, 2026

(30) Foreign Application Priority Data

Oct. 10, 2023 (DE) ..................... 10 2023 209 865.2

(51) Int. Cl.
*G06F 11/10* (2006.01)

(52) U.S. Cl.
CPC ...... *G06F 11/1068* (2013.01); *G06F 11/1016* (2013.01)

(58) Field of Classification Search
CPC ......................... G06F 11/1068; G06F 11/1016
See application file for complete search history.

(56) References Cited

U.S. PATENT DOCUMENTS

| | | | | |
|---|---|---|---|---|
| 9,805,771 | B2 | 10/2017 | Loibl et al. | |
| 10,951,240 | B2 | 3/2021 | Kern et al. | |
| 2020/0301614 | A1* | 9/2020 | Kern | G11C 16/32 |
| 2021/0288673 | A1* | 9/2021 | Kern | H03M 13/3988 |

FOREIGN PATENT DOCUMENTS

| | | | |
|---|---|---|---|
| DE | 102018132503 | A1 | 6/2020 |

* cited by examiner

*Primary Examiner* — Thien Nguyen
(74) *Attorney, Agent, or Firm* — Eschweiler & Potashnik, LLC

(57) ABSTRACT

A solution for correcting errors is proposed, wherein a bit group of n memory cells is read and n states are determined therefrom, wherein the n states are determined in a time domain for a $k_1$-out-of-n code and for a $k_2$-out-of-n code, where $k_1$ is less than $k_2$. Furthermore, for a read n-bit word, which is a non-code word instead of a code word of the $k_2$-out-of-n code, the previously read n-bit code word of the $k_1$-out-of-n code is used to determine possible erroneous bits in the read non-code word. Possible code words of the $k_2$-out-of-n code are determined for the non-code word based on the possible erroneous bits, and error correction is carried out using an external error code based on the possible code words.

24 Claims, 11 Drawing Sheets

Fig.9

Truth table:

| $s4_1$ | $v_1$ | $s4_3$ | $v_3$ | $s4_5$ | $V_5$ | $s4_7$ | $V_7$ | Erasure | $D_s$ |
|---|---|---|---|---|---|---|---|---|---|
| 1 | 0 | 0 | 0 | 0 | 0 | 0 | 0 | 1 | Error |
| 1 | 1 | 0 | 0 | 0 | 0 | 0 | 0 | 0 | $D_1$ |
| 1 | X | 1 | 0 | 0 | 0 | 0 | 0 | 1 | Error |
| 1 | X | 1 | 1 | 0 | 0 | 0 | 0 | 0 | $D_3$ |
| 1 | X | 1 | X | 1 | 0 | 0 | 0 | 1 | Error |
| 1 | X | 1 | X | 1 | 1 | 0 | 0 | 0 | $D_5$ |
| 1 | X | 1 | X | 1 | X | 1 | 0 | 1 | Error |
| 1 | X | 1 | X | 1 | X | 1 | 1 | 0 | $D_7$ |

ERROR CORRECTION

REFERENCE TO RELATED APPLICATIONS

This application claims priority to German Patent Application 10 2023 209 865.2, filed on Oct. 10, 2023, the contents of which are hereby incorporated by reference in their entirety.

TECHNICAL FIELD

The invention relates to error correction, in particular the efficient selection of a correct code word.

BACKGROUND

States from memory cells can be transformed into the time domain during reading in order to be able to differentiate the states from one another in the temporal sequence in which they occur.

One object is to improve existing solutions and, in particular, to provide an approach to error detection.

SUMMARY

This object is achieved in accordance with the features of the independent claims. Preferred embodiments can be gathered from the dependent claims, in particular.

These examples proposed herein may be based in particular on at least one of the following solutions. In particular, combinations of the following features can be used to achieve a desired result. The features of the method may be combined with any feature(s) of the apparatus, the device, or the system, or vice versa.

In order to achieve the object, an error correction method is proposed, in which a bit group of n memory cells is read and n states are determined therefrom, wherein the n states are determined in a time domain for a $k_1$-out-of-n code and for a $k_2$-out-of-n code, where $k_1$ is less than $k_2$; in which, for a read n-bit word, which is a non-code word instead of a code word of the $k_2$-out-of-n code, the previously read n-bit code word of the $k_1$-out-of-n code is used to determine possible erroneous bits in the read non-code word; in which possible code words of the $k_2$-out-of-n code are determined for the non-code word based on the possible erroneous bits; in which error correction is carried out using an external error code based on the possible code words.

It is a development that the error correction using the external error code comprises selecting a byte sequence that is a code word of the external error code.

It is a development that the non-code word has $k_2+1$ zeros or ones, depending on whether the zeros or ones are detected earlier in the time domain.

It is a development that $k_2+1-k_1$ possible erroneous bits are determined.

It is a development that the code words of the $k_1$-out-of-n code and of the $k_2$-out-of-n code are code words of a multi-code.

If different k values are used in a multi-code implementation, the result is a large number of code words. In this example, the code words for different k values form the code words of the multi-code.

It is a development that a difference between $k_1$ and $k_2$ is at least two.

It is a development that the previously read n-bit code word of the $k_1$-out-of-n code is used to determine possible erroneous bits in the read n-bit non-code word by determining those bit positions at which the non-code word differs from the n-bit code word of the $k_1$-out-of-n code.

It is a development that the previously read n-bit code word of the $k_1$-out-of-n code is used to determine possible erroneous bits in the read n-bit non-code word by exclusively OR-ing the non-code word with the n-bit code word of the $k_1$-out-of-n code.

It is a development that a bit group of n memory cells is read L times, possible code words of the $k_2$-out-of-n code are determined for non-code words of the $k_2$-out-of-n code, and combinations of L $k_2$-out-of-n code words are formed for each non-code word, the number of combinations depending on the number of possible code words.

It is a development that the following acts are carried out before reading: a code word of the external error code is transformed into code words of a second error code, wherein the second error code comprises code words of the $k_2$-out-of-n code, and the transformed code words are stored.

It is a development that the code word of the external error code comprises L K-bit bytes, is transformed into L code words of the second error code with n bits each and these transformed L code words of the second error code are stored.

It is a development that each of the combinations of L $k_2$-out-of-n code words is transformed back into a byte sequence, and that byte sequence which is a code word of the external error code is processed further.

It is a development that the external error code is a Reed-Solomon code.

An error correction apparatus is also proposed, comprising a processing unit which is configured such that the method described herein can be carried out.

Furthermore, an error correction apparatus is specified, including a memory, and a code circuit arrangement. The code circuit arrangement is configured to read a bit group of n memory cells from the memory; determine n states based on the read bit group, wherein the n states are determined in a time domain for a $k_1$-out-of-n code and for a $k_2$-out-of-n code, where $k_1$ is less than $k_2$; use the previously read n-bit code word of the $k_1$-out-of-n code for a read n-bit word, which is a non-code word instead of a code word of the $k_2$-out-of-n code, to determine possible erroneous bits in the read non-code word; determine possible code words of the $k_2$-out-of-n code for the non-code word based on the possible erroneous bits; and perform error correction using an external error code based on the possible code words.

It is a development that the apparatus comprises a further code circuit arrangement which is configured to transform a code word of the external error code into code words of a second error code, wherein the second error code comprises code words of the $k_2$-out-of-n code; and store the transformed code words in the memory.

It is a development that the code circuit arrangement and the further code circuit arrangement form a unit.

It is a development that a difference between $k_1$ and $k_2$ is at least two.

It is a development that the error correction using the external error code comprises selecting a byte sequence that is a code word of the external error code.

A computer program product which is directly loadable into a memory of a digital computer is specified, comprising program code parts which are configured to carry out acts of the method described herein.

BRIEF DESCRIPTION OF THE DRAWINGS

The above-described properties, features and advantages and the way in which they are achieved will be explained further in association with the following schematic description of exemplary embodiments which are explained in greater detail in association with the drawings. In this case, identical or identically acting elements may be provided with identical reference signs, for the sake of clarity.

FIG. 9 shows an exemplary truth table such as can be realized at least partly in the code selection circuit shown in FIG. 8.

DETAILED DESCRIPTION

Figure 1:
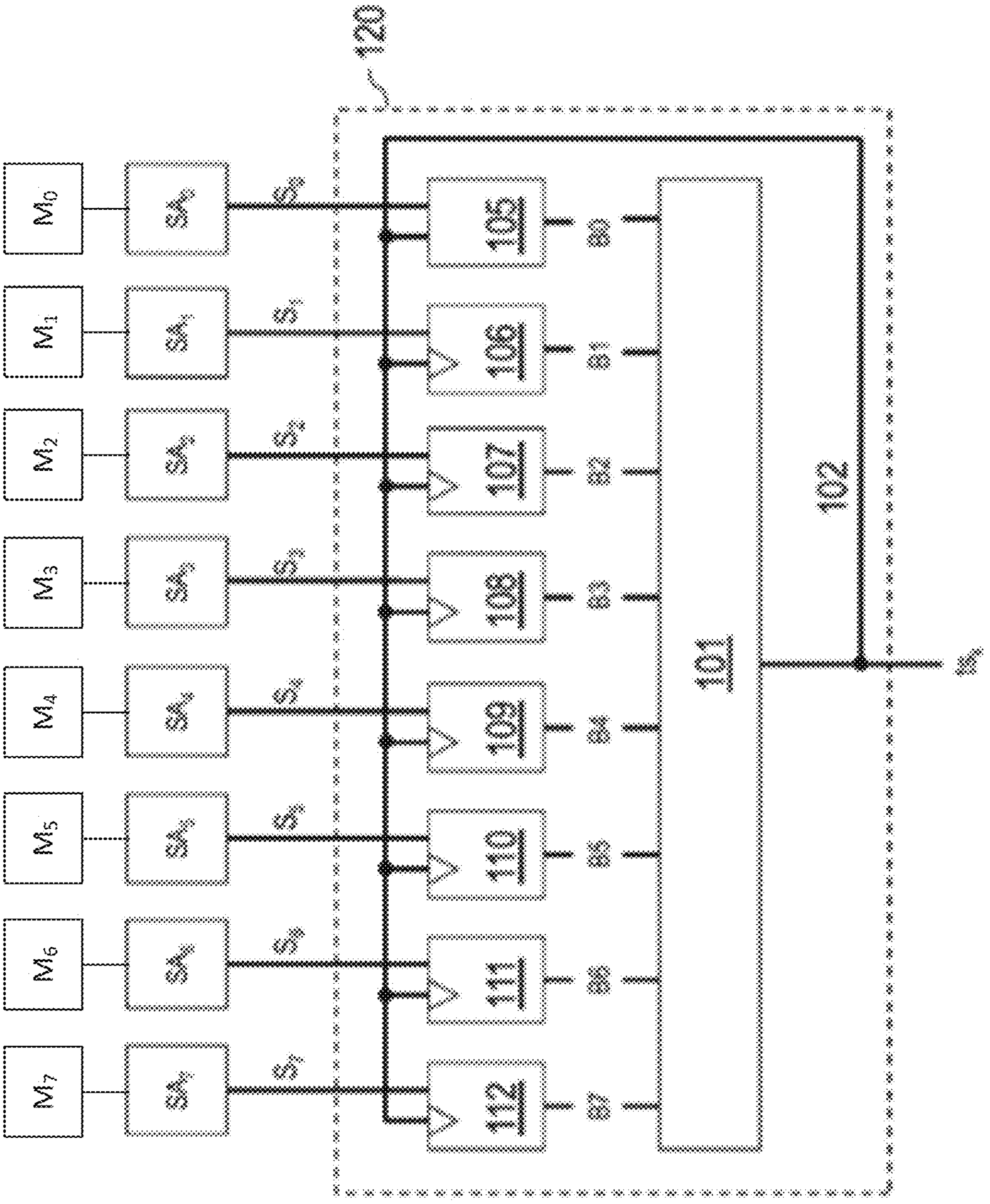
FIG. 1 shows an exemplary circuit arrangement for detecting the k fastest states (bits) of a k-out-of-8 code.

By way of example, in the context of using resistive memories (RRAMs or ReRAMs) complementary memory cells are used for storing information. In principle, two or more complementary memory cells can be used. In the case of complementary memory cells, a data bit is represented by (at least) two physical memory cells which have complementary states in the error-free case. By way of example, if two complementary memory cells A1 and A2 are used to represent a logic data bit, then the following can hold true:

A logic value "0" is present if the following holds true for the complementary memory cells A1 and A2: A1=0 and A2=1.

A logic value "1" is present if the following holds true for the complementary memory cells A1 and A2: A1=1 and A2=0.

In the error-free case, the two memory cells A1 and A2 thus always have complementary values: If the memory cell A1 has the value 0, then the memory cell A2 has the value 1, and vice versa.

Complementary memory cells can be used e.g. for arbitrary k-out-of-n codes. A code word of an exemplary 3-out-of-6 code has 6 bits, of which 3 bits always have either the value 0 or the value 1 and the remaining 3 bits in the error-free case have the value complementary thereto.

It generally holds true for a k-out-of-n code that there are $$\binom{n}{k}$$

code words each having k first values and (n−k) second values. It holds that $$\binom{n}{k} = \frac{n!}{k! \cdot (n-k)!}.$$

If a k-out-of-8 code for 8 memory cells is considered, for example, this gives rise to the following for different k values:

k=1: There are 8 different code words.

k=3: There are 56 different code words.

k=5: There are 56 different code words.

k=7: There are 8 different code words.

If different k values are used in a multi-code implementation in accordance with this example, this gives rise to 128 code words. These 128 code words can be coded using 7 bits (27=128). Such a multi-code implementation achieves a significant increase in efficiency compared with a simple 4-out-of-8 code with just 70 code words (allows 6 bits to be coded with 64 values).

The approach described here is suitable for RRAMs, but can also be used for other types of memory.

DE 10 2018 132 503 B4 discloses a circuit which determines the k fastest states in a k-out-of-n code. As soon as the k fastest states have occurred, the states are frozen.

The examples described herein determine a plurality of k fastest states. Based on the detection result, a code is determined or an error is output for the bit group.

A k-out-of-8 code where k=1, 3, 5, 7 is described by way of example below. The choice of k determines the distance between the errors and may be dependent on the respective implementation or error tolerance.

FIG. 1 shows an exemplary circuit arrangement for detecting the k fastest states (bits) of a k-out-of-8 code. Here n is 8 by way of example and a bit group of 8 memory cells M0 to M7 is read.

Measuring amplifiers $SA_0$ to $SA_7$ supply states $S_0$ to $S_7$ of the 8 memory cells of a memory. These states are fed to a circuit block 101 via latches 105 to 112 (e.g. realized as D-type flip-flops). In the circuit block 101, the k fastest 1 states are detected and the states of the latches 105 to 112 are then frozen ("latched") by way of the signal 102.

Therefore, as soon as the signal 102 of the circuit block 101 switches from 0 to 1, the k fastest 1 states have been detected and the latches 105 to 112 are stopped in such a way that the output signals provided by them no longer change. At this "frozen" point in time, the k fastest 1 states are present at the outputs of the latches 105 to 112. At the outputs of the latches 105 to 112, the states in the form of the bits B0 to B7 can be tapped off and processed further and/or stored.

The signal 102 also serves as a switching signal tsk, where k again denotes the number of fastest bits determined by the circuit block.

The circuit block 101 comprises an associated logic circuit, which can also be referred to as a code circuit. The associated logic circuit enables the k fastest 1 states to be detected. By way of example, by means of such a logic circuit, at the point in time when the k fastest 1 states occur, all the states can be frozen by means of a signal 102. This is done for example by way of a logic combination of the output signals B0 to B7 of the latches 105 to 112: As soon as a possible combination of k 1 states is present, the latches 105 to 112 are frozen by way of the signal 102. Details concerning an exemplary setup of such a fast-state detection circuit 101 are described for example in DE 10 2018 132 503 B4, which is incorporated by reference.

A block 120 denotes that part of the circuit arrangement, also referred to hereinafter as tsk circuit (or code circuit arrangement), which, based on the states $S_0$ to $S_7$ of the memory cells of the bit group, determines the k fastest bits and supplies the switching signal tsk.

In the example described here, four such tsk circuits are provided for the different k fastest bits where k=1, 3, 5, 7, each of the circuit arrangements providing one of the switching signals $ts_1$, $ts_3$, $ts_5$, and $ts_7$.

Figure 2:
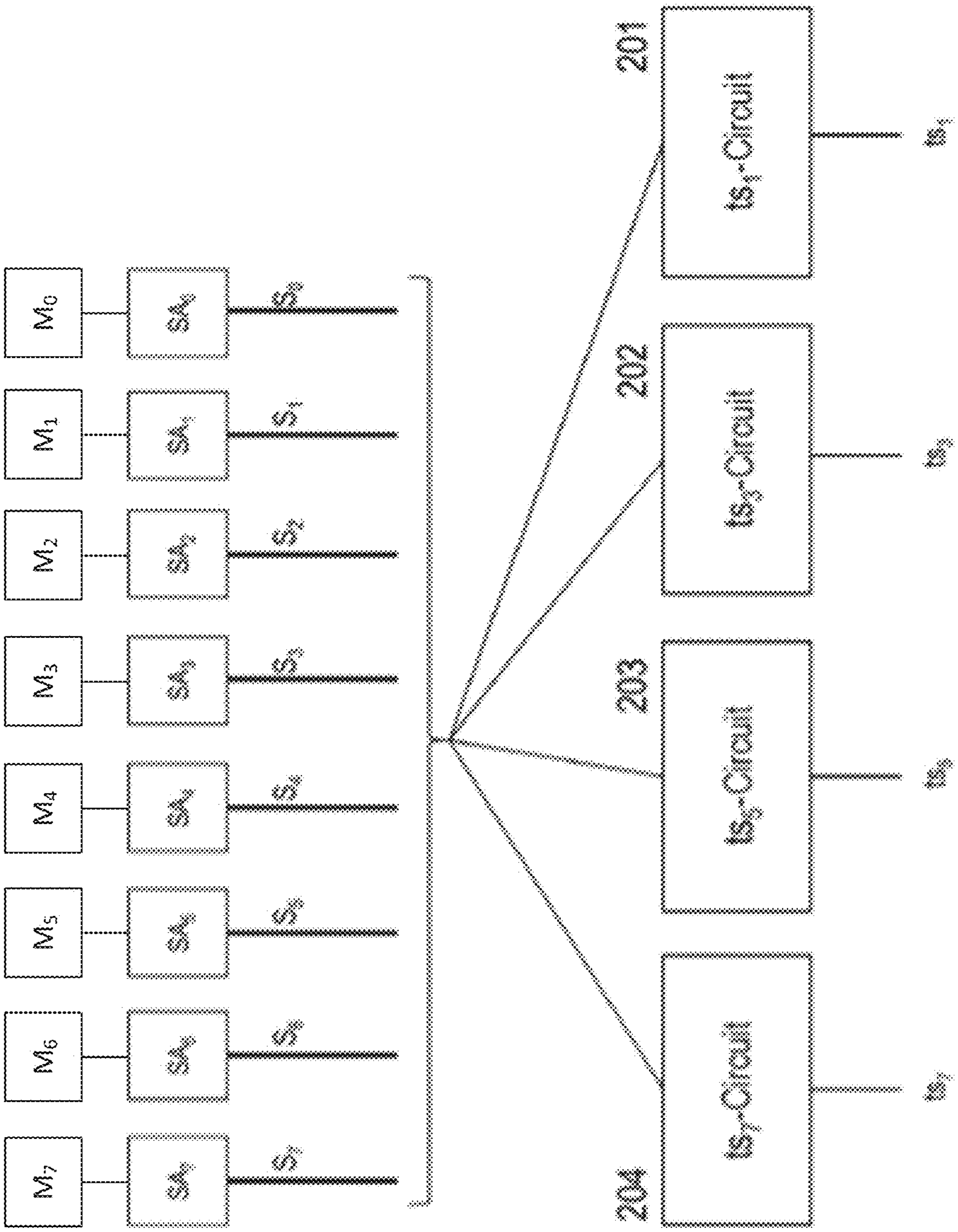
FIG. 2 shows an exemplary arrangement for a bit group having 8 bits and four tsk circuits (code circuit arrangements) for k=1, 3, 5, 7.

FIG. 2 shows an exemplary arrangement for a bit group having 8 bits and the four tsk circuits 201 to 204 for k=1, 3, 5, 7. For the sake of clarity, the wiring of the outputs of the measuring amplifiers $SA_0$ to $SA_7$ is represented symbolically: Each state $S_0$ to $S_7$ is passed (in parallel) to each of the tsk circuits 201 to 204. Consequently, in parallel, the following actions occur:

- the one fastest memory cell is ascertained with the aid of the $ts_1$ circuit 201, for example, single bit signal $ts_1$ can flip from a low state to a high state when the one (k=1) fastest 1 state for SA0-SA7 is detected,
- the three fastest memory cells are ascertained with the aid of the $ts_3$ circuit 202, for example, single bit signal $ts_3$ can flip from a low state to a high state when the three (k=3) fastest 1 states for SA0-SA7 are detected,
- the five fastest memory cells are ascertained with the aid of the $ts_5$ circuit 203, for example, single bit signal $ts_3$ can flip from a low state to a high state when the five (k=5) fastest 1 states for SA0-SA7 are detected, and
- the seven fastest memory cells are ascertained with the aid of the $ts_7$ circuit 204, for example, single bit signal $ts_7$ can flip from a low state to a high state when the seven (k=7) fastest 1 states for SA0-SA7 are detected.

Accordingly, the tsk circuits 201 to 204 provide the switching signals $ts_1$, $ts_3$, $ts_5$, and $ts_7$. The tsk circuit is also described as a code circuit arrangement because a specific k-out-of-n code is associated therewith.

Figure 3:
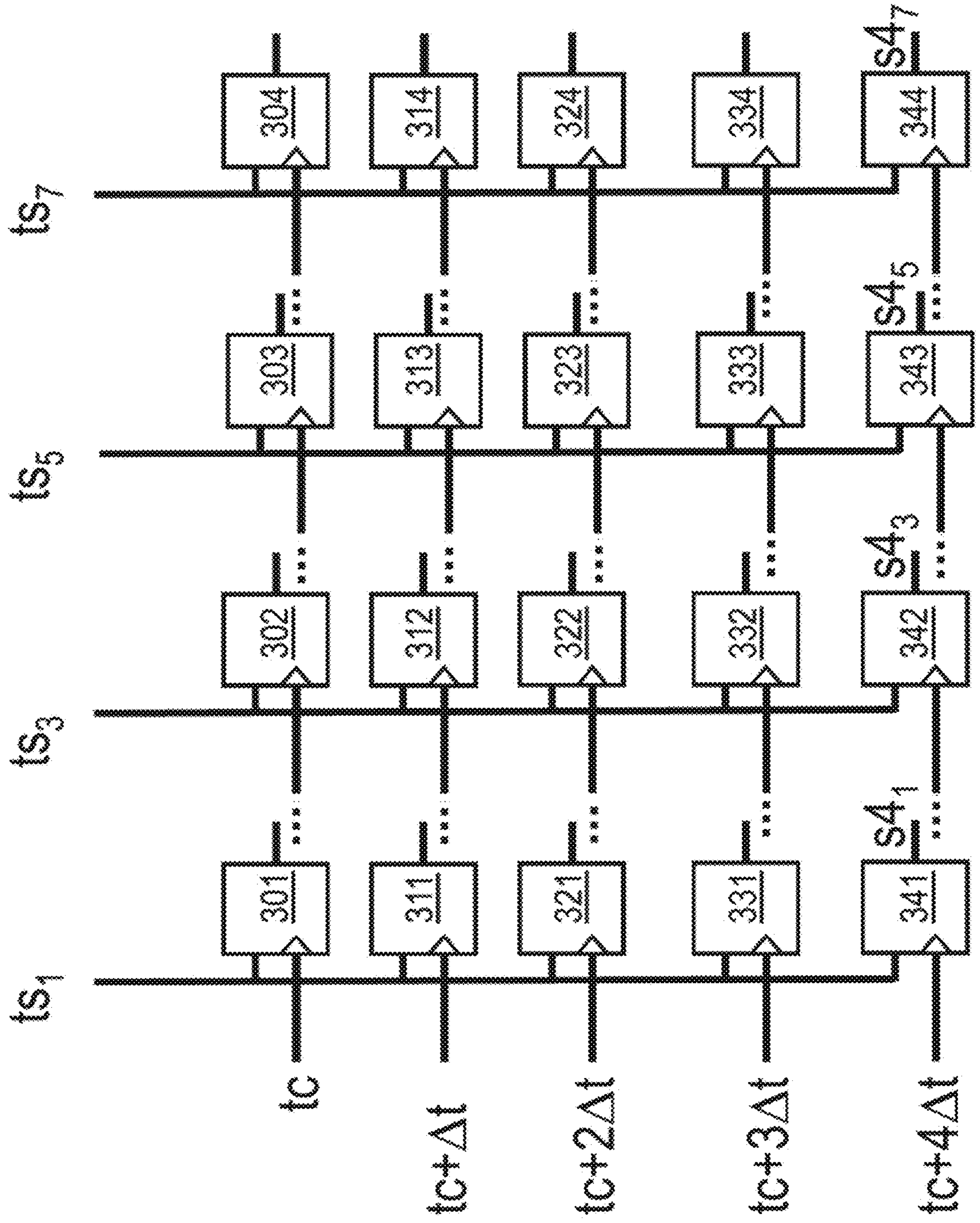
FIG. 3 shows an exemplary arrangement (selection circuit) for further processing of the switching signals $ts_1$, $ts_3$, $ts_5$, and $ts_7$.

FIG. 3 shows an exemplary arrangement for further processing of the switching signals $ts_1$, $ts_3$, $ts_5$, and $ts_7$. This arrangement is also referred to as a selection circuit. In this example, at different points in time according to the following expression:

$$tc + i \cdot \Delta t,$$

where i=0, . . . , 4, the states of the switching signals $ts_1$, $ts_3$, $ts_5$, and $ts_7$ are stored. FIG. 3 shows exemplary storage by means of latches: the associated latches are frozen at the desired points in time of storage.

In this respect, FIG. 3 shows 20 latches 301 to 304, 311 to 314, 321 to 324, 331 to 334, and 341 to 344, which are connected to the switching signals $ts_1$, $ts_3$, $ts_5$, and $ts_7$. The 20 latches are organized in an array, which includes 4 columns and 5 rows in this example. Switching signal lines $ts_1$ to $ts_7$ extend along the respective columns, and timing lines $t_c$, $t_c+\Delta t$, $t_c+2\Delta t$, $t_c+3\Delta t$, and $t_c+4\Delta t$ extend along the respective rows. The latches of each column have a first input coupled to the switching signal line of that column (e.g., latches 301, 311, 321, 331, 341 have first inputs coupled to switching signal line $ts_1$), while the latches of each row have a second input connected to a timing line of that row (e.g., latches 301, 302, 303, and 304 have second inputs coupled to timing line tc). The switching signal $ts_1$ is fed to the latches 301, 311, 321, 331, and 341, the switching signal $ts_3$ is fed to the latches 302, 312, 322, 332, and 342, the switching signal $ts_3$ is fed to the latches 303, 313, 323, 333, and 343, and the switching signal $ts_7$ is fed to the latches 304, 314, 324, 334, and 344.

At the point in time to the latches 301 to 304 are frozen, at the point in time $t_c+\Delta t$ the latches 311 to 314 are frozen, at the point in time $t_c+2\Delta t$ the latches 321 to 324 are frozen, at the point in time $t_c+3\Delta t$ the latches 331 to 334 are frozen, and at the point in time $t_c+4\Delta t$ the latches 341 to 344 are frozen. At the output of the latches 341 to 344 strobe signals $s\mathbf{4}_1$, $s\mathbf{4}_3$, $s\mathbf{4}_5$, and $s\mathbf{4}_7$ on strobe lines are present, indicating the state of the switching signals $ts_1$, $ts_3$, $ts_5$, and $ts_7$ at the point in time $t_c+4\Delta t$.

Figure 4:
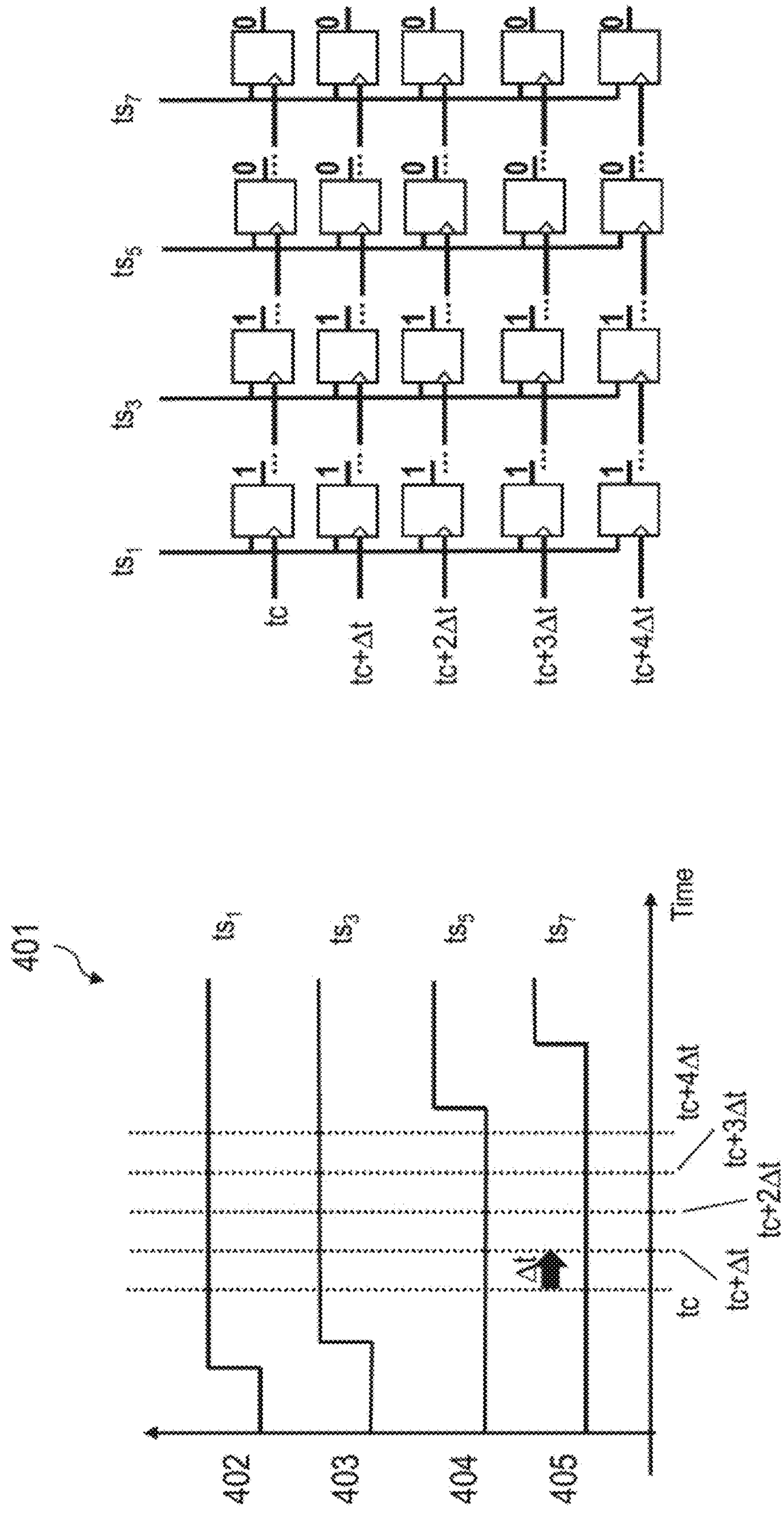
FIG. 4 shows a diagram with temporal profiles of the four switching signals $ts_1$, $ts_3$, $ts_5$, and $ts_7$, and a resulting allocation of the outputs of the selection circuit from FIG. 3.

FIG. 4 shows a diagram 401 with temporal profiles 402 to 405 of the four switching signals $ts_1$, $ts_3$, $ts_5$, and $ts_7$. The diagram 401 reveals that the switching signals $ts_1$, $ts_3$, $ts_5$, and $ts_7$ change from 0 to 1 at different points in time and thus indicate that the respective number of fastest memory cells has been detected.

At the points in time $t_c$, $t_c+\Delta t$, $t_c+2\Delta t$, $t_c+3\Delta t$, and $t_c+4\Delta t$ the states of the switching signals $ts_1$, $ts_3$, $ts_5$, and $ts_7$ are frozen according to the circuit shown in FIG. 3. The diagram 401 illustrates these points in time, each of which is determined by addition of the time duration $\Delta t$.

The point in time to thus determines the beginning of a read time window, the end of which is defined by the last point in time $t_c+4\Delta t$ illustrated here.

FIG. 4 furthermore includes the arrangement from FIG. 3 with an allocation of the outputs of the latches based on the profiles 402 to 405. It is thus discernible that at all the points in time $t_c$ to $t_c+4\Delta t$ the switching signals $ts_1$ and $ts_3$ are equal to 1, and the switching signals $ts_5$ and $ts_7$ are equal to 0. In other words, at the point in time $t_c+4\Delta t$ a 1-out-of-8 code word and a 3-out-of-8 code word are detected, but not a 5-out-of-8 code word, nor a 7-out-of-8 code word. An explanation is given below of how a decision can be taken as to which of the code words detected within the time window is processed further.

Figure 5:
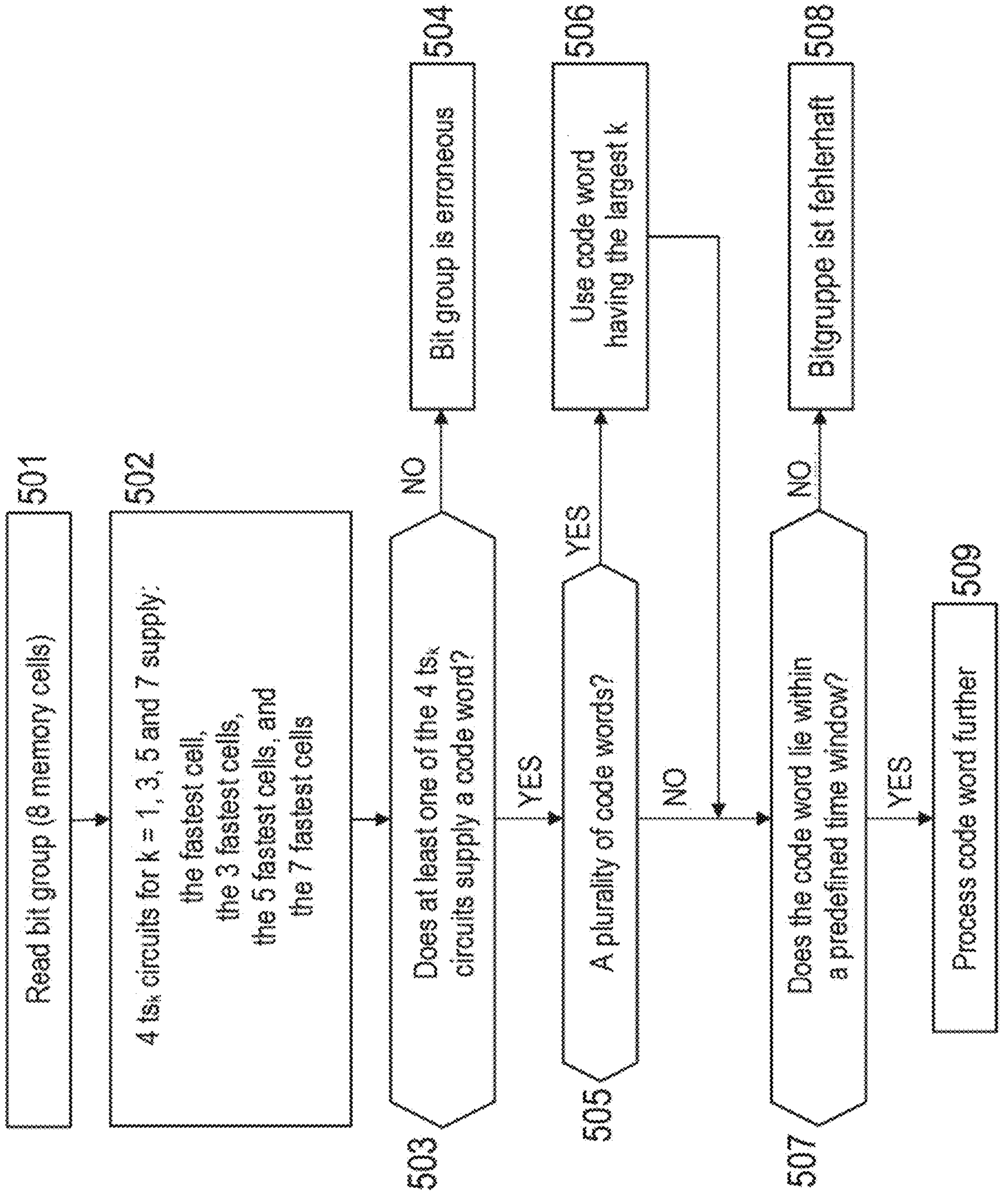
FIG. 5 shows an exemplary flow diagram for determining whether a code word and, if appropriate, which code word can be processed further.

FIG. 5 shows an exemplary flow diagram for determining whether a code word is supplied and, if appropriate, which code word can be processed further. This method can occur in circuitry of a receiver when a message bit stream is received over a communication channel. Thus, the receiver has a port on which the message bit stream is received, and a code circuit coupled to the port. The receiver and code circuit can be implemented as a single integrated circuit (e.g., transistors and/or other active or passive devices disposed on a semiconductor substrate), or multiple integrated circuits coupled to one another. The receiver and code circuit can also be implemented, wholly or in part, as discrete components and/or integrated circuits arranged on one or more printed circuit boards.

In act 501, a bit group is read. In the present example, 8 memory cells are read as the bit group.

In act 502, by means of four tsk circuits, the fastest cell, the 3 fastest cells, the 5 fastest cells and the 7 fastest cells are determined based on the signals or states read.

Act 503 involves checking whether at least one of the tsk circuits supplies a code word. In this context, code word means for

- k=1: a 1-out-of-8 code word,
- k=3: a 3-out-of-8 code word,
- k=5: a 5-out-of-8 code word, and
- k=7: a 7-out-of-8 code word.

If no code word is present, the bit group is detected as erroneous (act 504). In response to the code circuit detecting the bit group is erroneous, the code circuit can notify the receiver to request retransmission of the message bit stream over the communication channel (and/or the erroneous portions of the message bit stream).

Act 505 involves checking whether a plurality of code words have been determined. If this is the case, then that code word having the largest k is selected in an act 506 and the method branches to an act 507.

If only one code word is present, then the method branches directly from act 505 to act 507.

The act 507 involves checking whether the code word was determined within a predefined time window. If this is not the case, the bit group is detected as erroneous (act 508). In response to the code circuit detecting the bit group is erroneous, the code circuit can notify the receiver to request retransmission of the message bit stream over the communication channel (and/or the erroneous portions of the message bit stream).

If the code word lies within the predefined time window, then the method branches to act 509 and the code word is processed further.

The approach described here is able to be realized in particular (also) using hardware, which has an advantageous effect on the read times. A further advantage consists in erroneous bit groups being detectable, since error correction mechanisms can better correct errors limited to groups than non-localized errors.

One option consists in the code distance being able to be predefined as desired. By way of example, a larger code distance makes it possible to increase the robustness vis-à-vis errors. In this regard, values for k=1, 4, and 7 could be used, for example.

One option consists for example in other codes being able to be used as well, code words of successive codes differing in terms of their code distance.

In particular, it can be advantageous to determine the number of tsk circuits such that the sum of the code words corresponding to the tsk circuits results in a power of two.

Optionally, the code distance between successive tsk circuits can vary.

Figure 6:
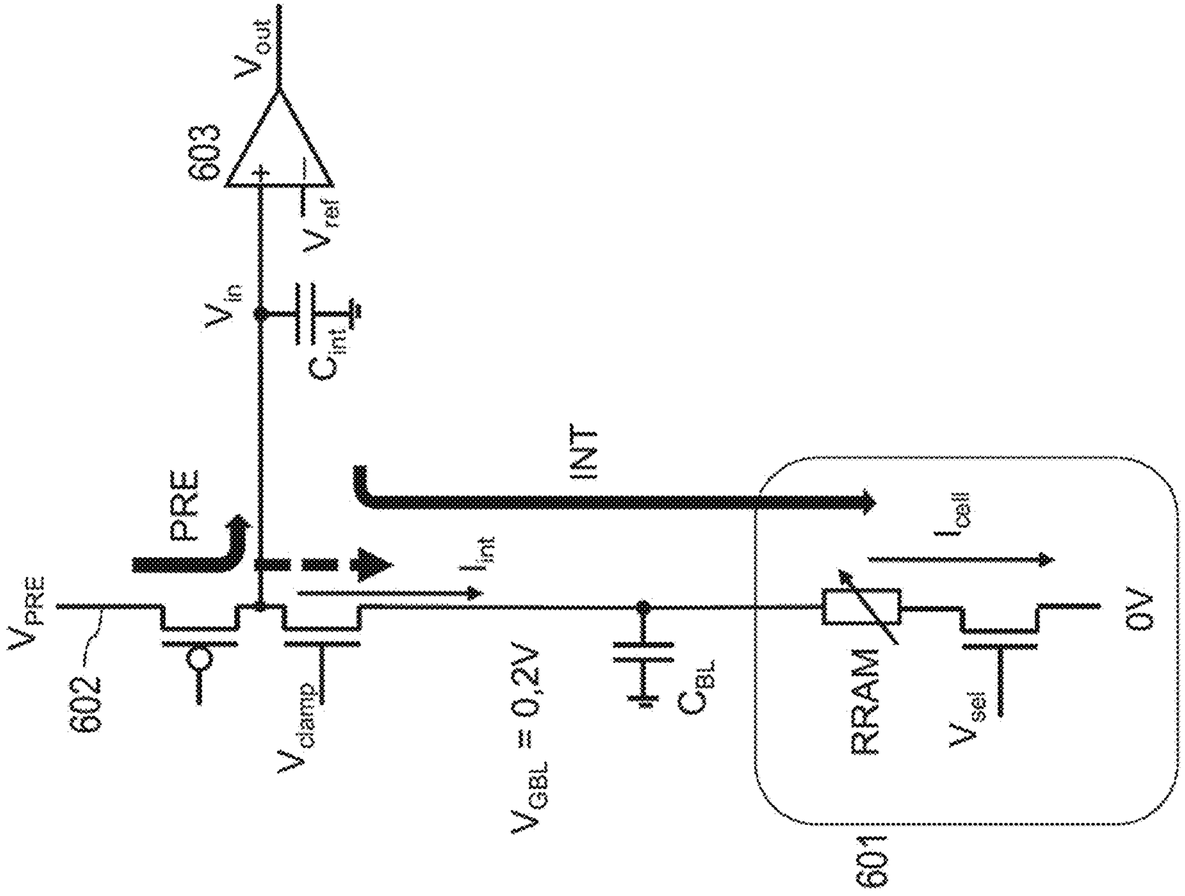
FIG. 6 shows a schematic diagram of a sense amplifier for a memory cell.

FIG. 6 shows a schematic diagram of a sense amplifier for a memory cell 601.

The memory cell 601 is illustrated by way of example as an RRAM memory cell. The memory cell 601 is selected via a MOSFET by means of a voltage Vsel and a current $I_{cell}$ flows through the memory cell.

Reading can be subdivided into two phases, a precharge phase and a measuring phase (sense phase).

A bit line 602 is precharged by means of a voltage $V_{PRE}$ (precharge voltage) to a portion of the precharge voltage (e.g. 0.2 V). A voltage $V_{in}$ corresponding to the voltage $V_{PRE}$ is present at the positive input of an operational amplifier 603. The positive input of the operational amplifier (comparator) 603 is connected to ground via a capacitor $C_{int}$. A reference voltage Vref is present at the negative input of the operational amplifier 603. The operational amplifier 603 supplies an output voltage Vout at its output.

Figure 7:
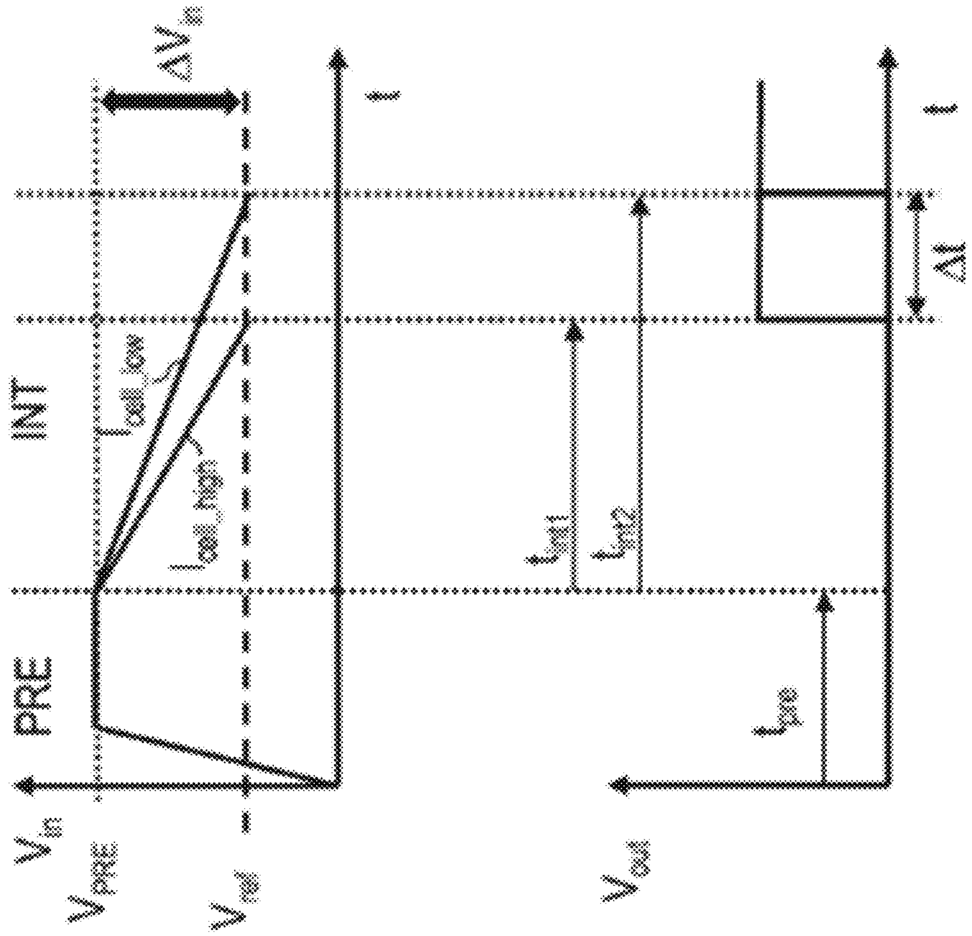
FIG. 7 shows a diagram of the voltage Vin and the output voltage Vout at the sense amplifier in accordance with FIG. 6 versus time t.

FIG. 7 shows a diagram of the voltage Vin and the output voltage Vout versus time t.

Two phases are described below, a precharge phase PRE and an integration phase INT.

During the time $t_{pre}$, the bit line 602 and the capacitor $C_{int}$ are precharged. The time $t_{pre}$ is approximately 5 ns, for example. During the precharge phase PRE, the voltage $V_{in}$ rises to a voltage $V_{PRE}$.

The integration phase INT is also referred to as measuring phase; it follows the precharge phase PRE and is determined by a time $t_{int}$, where it holds true that $$t_{int} = \Delta V_{in} \cdot \frac{C_{int}}{I_{cell}},$$

where $$\Delta V_{in} = V_{PRE} - V_{ref}.$$

If the memory cell 601 has a high resistance value, then a lower current $I_{cell}=I_{cell\_low}$ flows through the memory cell. By contrast, if the resistance value is low, then the cell current $I_{cell}=I_{cell\_high}$ is greater than $I_{cell\_low}$. During the integration phase, in accordance with the equation above, different time durations $t_{int}$ arise, a shorter time duration $t_{int}$ for the high cell current $I_{cell\_high}$ and a longer time duration $t_{int2}$ for the lower cell current $I_{cell\_low}$. The difference between these two time durations is $$\Delta t = t_{int2} - t_{int1}.$$

Precisely this difference Δt between the different cell states can be used for parameterizing the storage times $$tc + i \cdot \Delta t$$

in accordance with the explanations above. Advantageously, the time duration $t_c$ can be chosen in a range of between 3 ns and 5 ns.

Preferably, the time duration $t_c$ can be adapted such that it is determined by the typical integration time for a high-current cell ($I_{cell\_high}$) and a low-current cell ($I_{cell\_low}$). A maximum time duration $t_c$ can also be determined by $$r_{readmax} - t_{pre},$$

where $t_{readmax}$ denotes the maximum read access time.

Further Advantages and Examples

The approaches shown here make possible a multi-code approach without the use of reference currents for differentiating the codes. For each code a dedicated circuit is used (also referred to as tsk circuit in the example above) in order to provide a switching signal tsk if a code word (of a k-out-of-n code) has possibly been detected. This is followed by checking as to whether, after freezing, a code word is also present in the latches. This is necessary for example because, between the detection of the k fastest bits and the actual freezing of the latches, a further bit might have changed its state and k+1 bits were thus incorrectly frozen. No code word of the k-out-of-n code is then present. Furthermore, it is advantageously proposed to carry out a prioritization in such a way that in the case where a plurality of code words (of different codes) are detected, that code word having the largest k is used and processed further. This is advantageously done in relation to a predefined time window that determines a period of validity for the code words.

Figure 8:
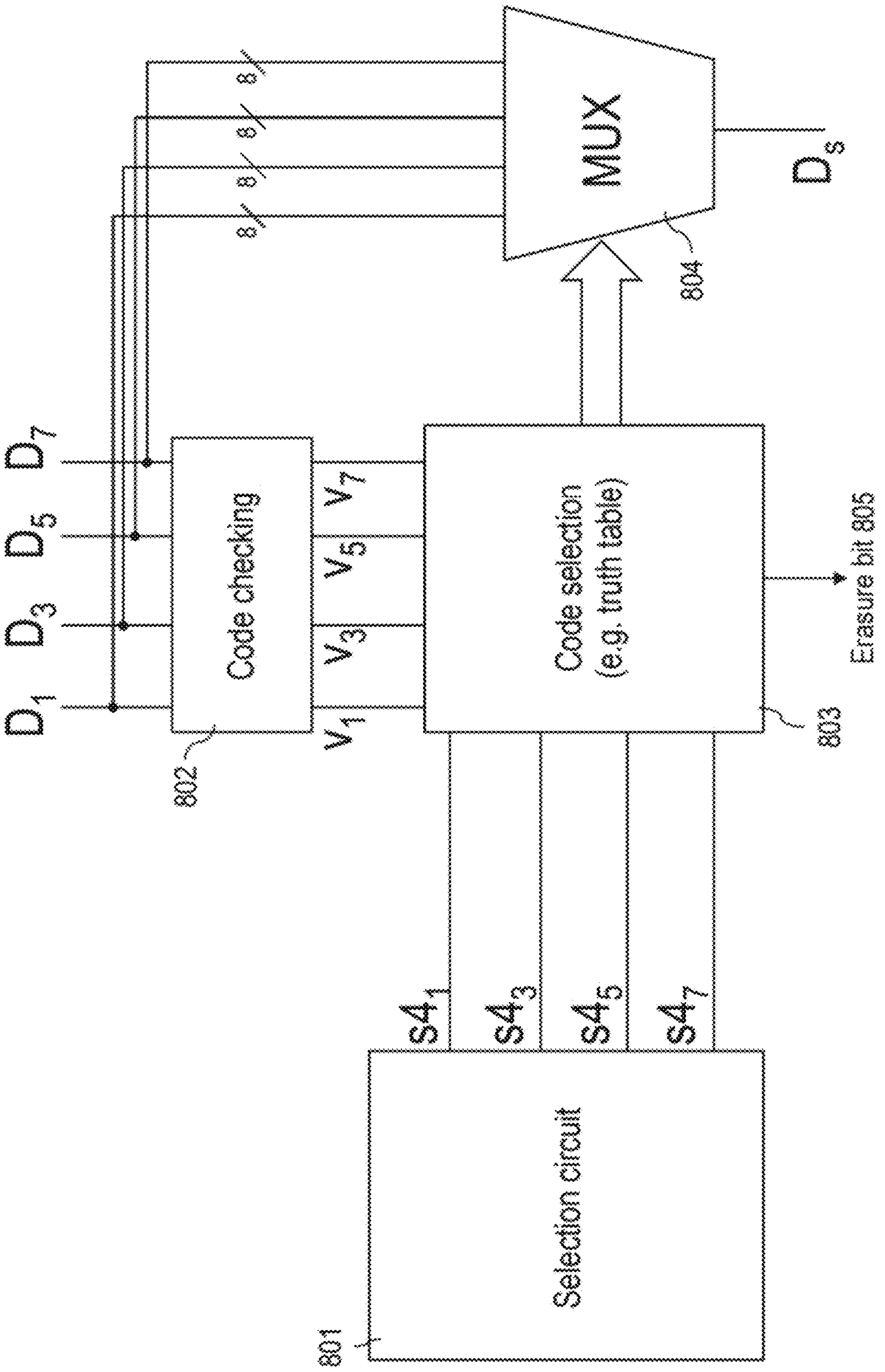
FIG. 8 shows a block diagram for selecting a code word or outputting a so-called erasure.

Exemplary Implementation:

FIG. 8 shows an exemplary schematic block diagram for determining or selecting a code word or alternatively a so-called “erasure” for the case where no code word or no code word to be used was detected. The erasure can be for example a bit (or flag) indicating that the bit group was detected as erroneous or that a detected code word ought not to be used.

A selection circuit 801 supplies the strobe signals $s4_1$, $s4_3$, $s4_5$, and $s4_7$ (see FIG. 3 with explanations).

The frozen data words Dk for k=1, 3, 5, 7 are provided to a circuit for code checking 802. As was explained in association with FIG. 1 and FIG. 2, there is one tsk circuit each for k=1, 3, 5, 7. After freezing, each of these circuits supplies a data word Dk having the bits B0 to B7 in accordance with FIG. 1.

The circuit for code checking 802 then establishes for each data word Dk whether a code word is involved. One reason is that although the circuit shown in FIG. 1 attempts to determine (only) the k fastest bits, more than k bits can actually be frozen and the frozen data word Dk is therefore not a k-out-of-n code word. The circuit for code checking 802 thus checks whether

- the data word $D_1$ of the $ts_1$ circuit 201 is a 1-out-of-8 code word (k=1),
- the data word $D_3$ of the $ts_3$ circuit 202 is a 3-out-of-8 code word (k=3),
- the data word $D_5$ of the $ts_5$ circuit 203 is a 5-out-of-8 code word (k=5), and
- the data word $D_7$ of the $ts_7$ circuit 204 is a 7-out-of-8 code word (k=7).

If this is the case, i.e. if the respective k-out-of-8 code word is present, then that is indicated by way of example by means of a validity bit $v_k$ for the respective k-out-of-8 code (k=1, 3, 5, 7).

For example, the circuit for code checking can be realized by means of gate logic in such a way that, for each k-out-of-8 code, a check is made to ascertain whether the data word Dk is a code word: For $D_1$, for example, the following Boolean logic can be realized by means of gates:

$$(``B0 \wedge \neg B1 \wedge \neg B2 \wedge \neg B3 \wedge \neg B4 \wedge \neg B5 \wedge \neg B6 \wedge \neg B7")`` \vee$$
$$(\neg B0 \wedge B1 \wedge \neg B2 \wedge \neg B3 \wedge \neg B4 \wedge \neg B5 \wedge \neg B6 \wedge \neg B7) \vee$$
$$(\neg B0 \wedge \neg B1 \wedge B2 \wedge \neg B3 \wedge \neg B4 \wedge \neg B5 \wedge \neg B6 \wedge \neg B7) \vee$$
$$(\neg B0 \wedge \neg B1 \wedge \neg B2 \wedge B3 \wedge \neg B4 \wedge \neg B5 \wedge \neg B6 \wedge \neg B7) \vee$$
$$(\neg B0 \wedge \neg B1 \wedge \neg B2 \wedge \neg B3 \wedge B4 \wedge \neg B5 \wedge \neg B6 \wedge \neg B7) \vee$$
$$(\neg B0 \wedge \neg B1 \wedge \neg B2 \wedge \neg B3 \wedge \neg B4 \wedge B5 \wedge \neg B6 \wedge \neg B7) \vee$$
$$(\neg B0 \wedge \neg B1 \wedge \neg B2 \wedge \neg B3 \wedge \neg B4 \wedge \neg B5 \wedge B6 \wedge \neg B7) \vee"$$
$$(``\neg B0 \wedge \neg B1 \wedge \neg B2 \wedge \neg B3 \wedge \neg B4 \wedge \neg B5 \wedge \neg B6 \wedge B7")$$

The result of this logic is 1 only if one of the 1-out-of-8 code words 1000 0000, 0100 0000, 0010 0000, 0001 0000,
0000 1000, 0000 0100, 0000 0010, 0000 0001 is present. Corresponding logics can be provided for the 56 3-out-of-8 code words, the 56 5-out-of-8 code words and the 8 7-out-of-8 code words.

The strobe signals $s4_1$, $s4_3$, $s4_5$, and $s4_7$, and the validity bits $v_1$, $v_3$, $v_5$, and $v_7$ are fed to a code selection circuit 803. On the basis of these input signals, the code selection circuit 803 either selects a data word as code word for further processing or else indicates by means of the erasure that no code word or no suitable code word can/ought to be selected.

The decision can be taken in the code selection circuit 803 by means of a truth table. FIG. 9 shows an exemplary truth table of this type.

As described above, the code word having the largest k is intended to be processed further. In this example, k=7 is the largest value for k. Accordingly, if available within the time window, the data word $D_7$ ought to be selected, although only if it is also a code word of the 7-out-of-8 code. If a data word $D_7$ is present which is not a code word of the 7-out-of-8 code, an error is indicated by means of the erasure. No other code word having a smaller k is then used either.

The letter "X" in the truth table indicates that this value does not matter for the respective row.

If it is detected that the data word having the largest k is a code word, this is selected. This is done in accordance with the arrangement shown in FIG. 8, by way of example, by means of a multiplexer (MUX) 804 controlled by the code selection circuit 803. On the input side, the 8-bit-wide data words $D_1$, $D_3$, $D_5$, and $D_7$ are passed to the MUX 804. The code selection circuit controls the MUX 804 such that the data word which satisfies the conditions described here is provided as the selected data word $D_s$. If none of the data words $D_1$, $D_3$, $D_5$, and $D_7$ are selectable, this can be indicated by an erasure bit 805, for example. Alternatively, in this case, a further input of the MUX 804 could be selected, which provides at the output a predefined bit combination (which is different than the selectable code words) which is able to be taken as a basis for detecting that an error is present and no data word could be selected.

The erasure bit 805 indicates whether or not the data word having the largest k that occurs in the time window is a code word. If it is not a code word, then by way of example the erasure bit is equal to 1, an error is indicated and no code word (not even a code word having a smaller k) is selected.

Correction Using an External Error Code

Figure 10:
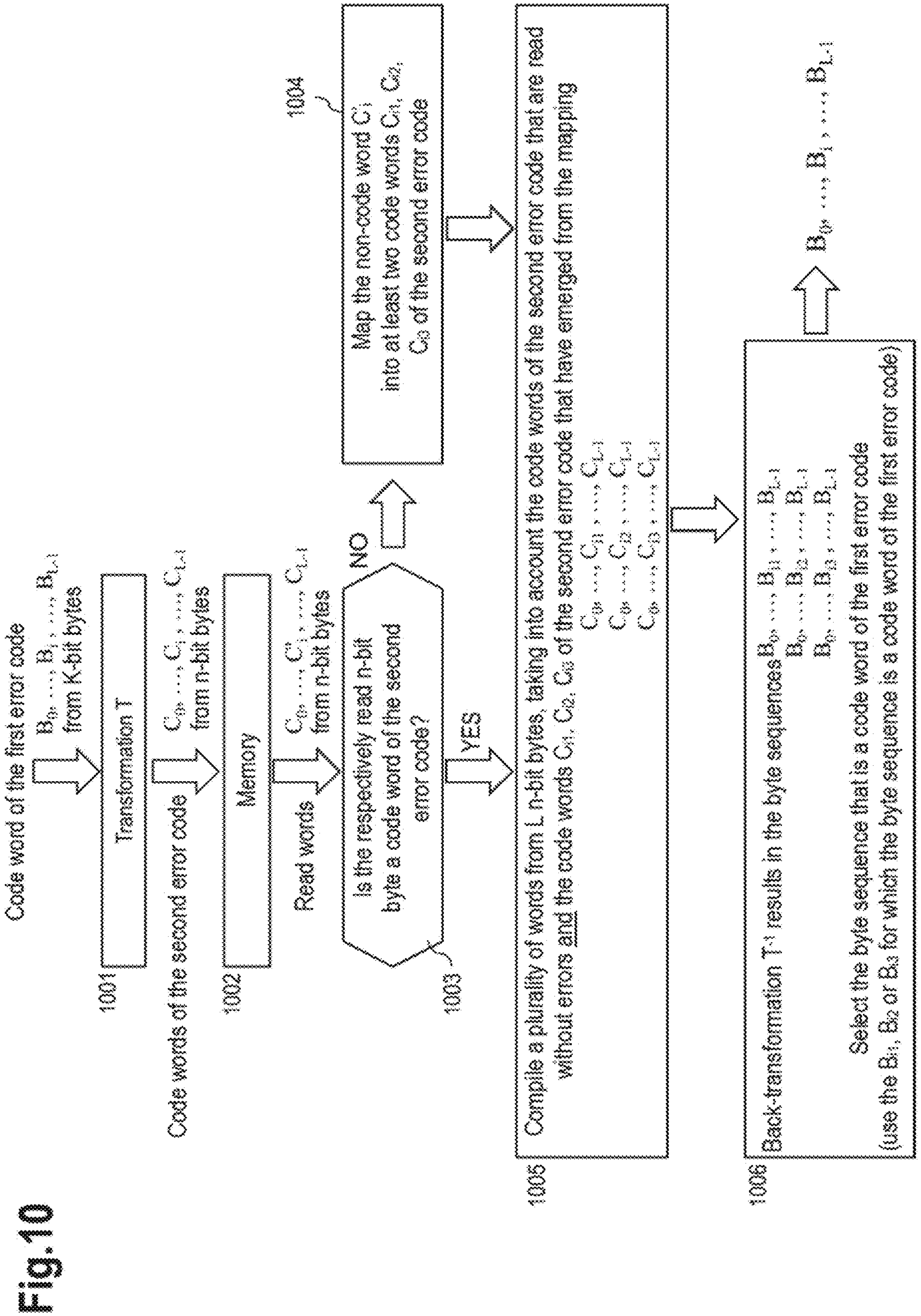
FIG. 10 shows a schematic diagram for error correction using an external error code.

FIG. 10 shows a block diagram for schematically illustrating a correction or selection by means of an external error code (also referred to as the first error code). The external error code can be in particular a byte error-detecting and/or byte error-correcting code. For example, the external error code is a Reed-Solomon code.

A code word of the first error code with a number of L K-bit bytes $B_0, \ldots, B_{L-1}$ is transformed into L code words of a second error code by means of a transformation T 1001. Each of the code words $C_0, \ldots, C_{L-1}$ of the second error code has a length of n bits (each of the code words of the second error code is therefore an n-bit byte). The L code words $C_0, \ldots, C_{L-1}$ of the second error code are stored in a memory 1002.

The L code words are then read from the memory. In the example described here, it is assumed that a single n-bit byte $C'_i$ has an error when reading, with the result that it is no longer a code word of the second error code. This n-bit byte $C'_i$ is also referred to as a "non-code word".

The n-bit byte $C'_i$ can be any byte with $i=0, \ldots, L-1$.

To illustrate the relationship, a K-bit byte Bi and a code word $C_i$ of the second error code are also shown in FIG. 10 before being stored in the memory 1002: The K-bit byte Bi is converted into the n-bit byte $C_i$ by the transformation 1001 and is then stored in the memory 1002.

In act 1003, the L n-bit bytes $C_0, \ldots, C'_i, \ldots, C_{L-1}$ are read (for example in succession). If the read n-bit byte is a code word of the second error code, it is forwarded to act 1005. If the read n-bit byte is not a code word of the second error code, the method branches to act 1004. This is the case in the present example for the n-bit byte $C'_i$.

In act 1004, the non-code word $C'_i$ is mapped into at least two code words of the second error code. In the present example, the non-code word $C'_i$ is mapped into three code words $C_{i1}$, $C_{i2}$, and Cis of the second error code. The results of the mapping, in this example $C_{i1}$, $C_{i2}$, and $C_{i3}$, are forwarded to act 1005.

The details of the mapping according to act 1004 are explained further below.

In act 1005, a plurality of words each having a number of L n-bit bytes of the second error code are compiled, the n-bit bytes being determined by the code words of the second error code that are read without errors and the results of the mapping $C_{i1}$, $C_{i2}$, and $C_{i3}$ (which are also code words of the second error code). On account of the mapping, there are three different possibilities for L n-bit bytes of the second error code:

$C_0, \ldots, C_{i1}, \ldots, C_{L-1}$ $C_0, \ldots, C_i2, \ldots, C_{L-1}$ $C_0, \ldots, C_{i3}, \ldots, C_{L-1}$ One of the code words $C_{i1}$, $C_{i2}$, and Cis is the correct code word and thus leads to a correct combination of L n-bit bytes.

This can be determined with a subsequent back-transformation $T^{-1}$ in an act 1006. L n-bit bytes are transformed back into L K bytes in each case, wherein one of the byte sequences obtained is a code word of the first error code.

The back-transformation thus results in:

$B_0, \ldots, B_{i1}, \ldots, B_{L-1}$ $B_0, \ldots, B_{i2}, \ldots, B_{L-1}$ $B_0, \ldots, B_{i3}, \ldots, B_{L-1}$ The $B_{i1}$, $B_{i2}$ or $B_{i3}$ for which the byte sequence is a code word of the first error code is selected.

For example, the first error code is a byte error-correcting code, such as a Reed-Solomon code. A code word $C_i$ of the second error code comprises n bits. For example, the second error code is a k-out-of-n code with $1 \le k \le n$. According to the example given here, different values for k can be used.

In addition, it should be noted that a plurality of n-bit byte words cannot be code words of the second error code either and are therefore erroneous, wherein, for example, for each n-bit byte that is not a code word of the second error code, three code words of the second error code can be determined, for example. One of these three determined n-bit bytes can then be an error-free n-bit byte.

If, for example, two n-bit bytes do not contain any code words of the second error code, then byte sequences in which both determined n-bit bytes are each error-free result. The byte sequence in which both bytes that are then selected are error-free can be used for further processing.

This approach can be applied accordingly if further n-bit bytes are not code words of the second error code.

Steps 1003 to 1006 and reading from the memory 1002 can be carried out by at least one code circuit arrangement. Step 1001 and storage in the memory 1002 can also be carried out by at least one code circuit arrangement. Identical or partially different code circuit arrangements can be used. The term code circuit arrangement may include at least one component comprising hardware, firmware and/or software.

Exemplary Implementation of the Mapping According to Act 1004

As explained in connection with the circuit for code checking 802, when attempting to determine the k fastest bits, more than k bits can actually be frozen, with the result that the frozen data word Dk is not a k-out-of-n code word.

The case is considered below for possible data words Dk for k=1, 3, 5, 7. The following holds true for k>1, i.e. for k=3, 5, 7:

If the frozen data word with the smaller value k is a valid k-out-of-n code word, it is possible to evaluate at least one additionally frozen bit in the context of the data word with the smaller value k in order to determine a reduced number of possible code words.

This is explained below using an example.

Figure 11:
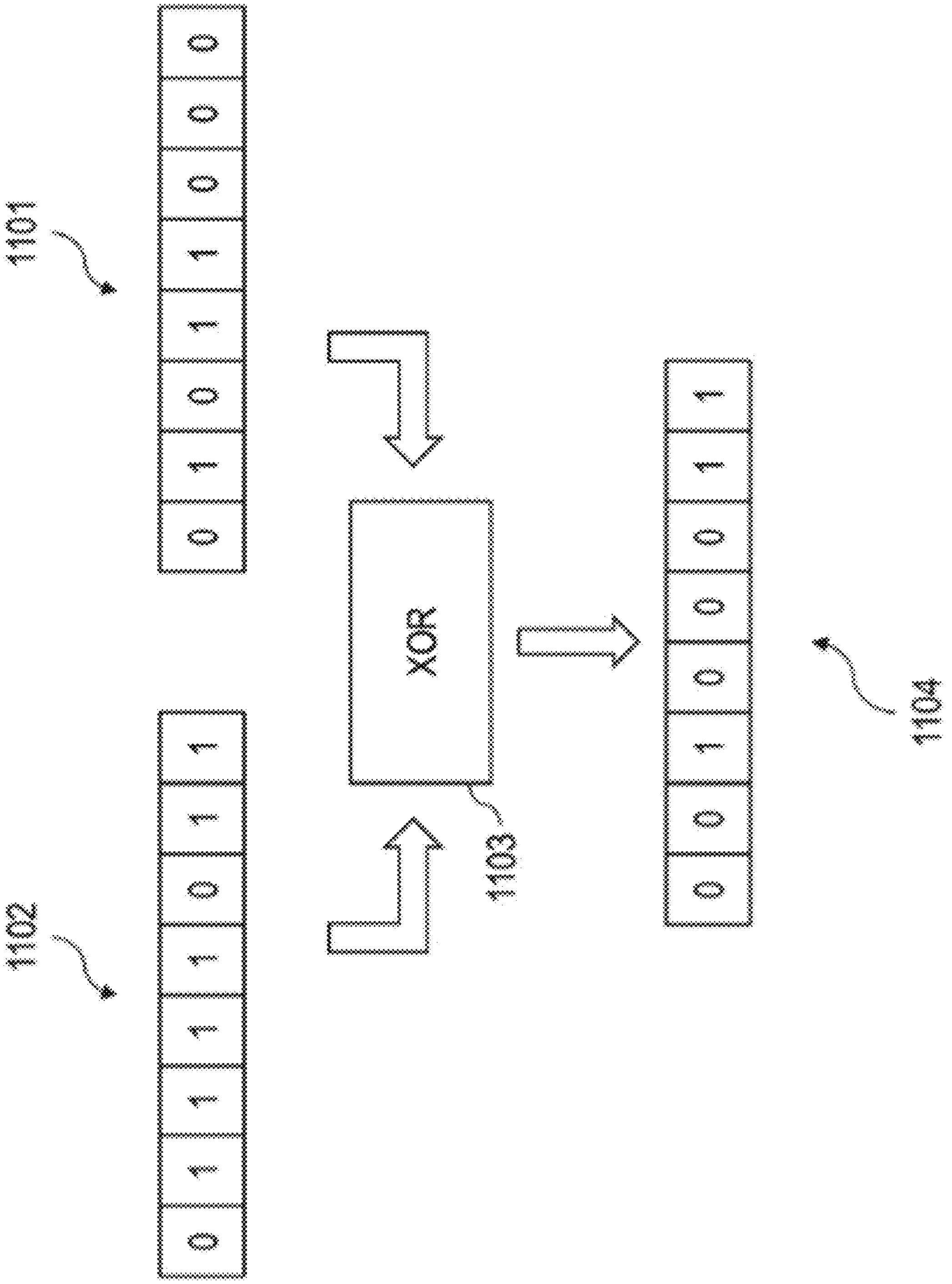
FIG. 11 shows an exemplary implementation for detecting the possibly erroneous bits in a non-code word.

FIG. 11 shows a 3-out-of-8 code word 1101 obtained by means of a $ts_3$ circuit 202. The three fastest memory cells were determined as described above.

Also shown is a 6-out-of-8 word 1102 which was determined by the $ts_5$ circuit 203: Due to the time window between triggering and actual freezing, an additional bit has slipped through, and so the result is not a 5-out-of-8 code word, but a 6-out-of-8 word.

The $ts_3$ circuit 202 therefore first determined the code word 01011000 with the three fastest ones and then the $ts_3$ circuit 203 determined the 6-out-of-8 non-code word 01111011 with the six fastest ones.

An exclusive OR-ing 1103 can now be used to determine which bits of the 6-out-of-8 non-code word may be erroneous. These are those bits which differ from the bits of the 3-out-of-8 code word, i.e. 00100011 (cf. reference sign 1104). There are therefore three bits that have the value 1 in the 6-out-of-8 word, even though only two of these three bits can have the value 1.

Therefore, there are the following three possibilities for correct 5-out-of-8 code words based on the 6-out-of-8 word 1102, taking into account the context of the 3-out-of-8 code word (i.e. the data word with the smaller k value, k=3):

01 1 110 10

01 1 110 01

01 0 110 11

These three code words of the second error code (here the 5-out-of-8 error code) are the result of the mapping in act 1004 described above and correspond to the n-bit bytes $C_{i1}$, $C_{i2}$, and Cis there. They are combined with the remaining code words of the second error code to form the L n-bit bytes, as described in act 1005. Then, in act 1006, the external (first) error code is used to check which byte sequence (after back-transformation) is a code word of the first error code. This then corresponds to the correct (corrected) byte sequence $B_0, \ldots, B_{L-1}$ (see FIG. 10).

Further Examples and Observations

For example, the functions described herein can be implemented at least in part using hardware, e.g. specific hardware components and/or a processor. In particular, the functions can be realized by means of hardware, processors, software, firmware or any desired combinations thereof.

If implemented using software, the functions can be stored on a computer-readable medium or can be transmitted as one or more instructions or program code and can be executed by a hardware-based processing unit. Computer-readable media can include computer-readable storage media corresponding to physical media, for example data storage media, or communication media comprising an arbitrary medium that enables a computer program to be transmitted, for example using a communication protocol. In this way, computer-readable media can correspond to physical, nonvolatile computer-readable storage media or communication media, for example in the form of signals.

Data storage media can be any available media which can be accessed by one or more computers or one or more processors in order to retrieve instructions, code and/or data structures for implementing the techniques described in this disclosure. A computer program product can include a computer-readable medium.

By way of example, computer-readable storage media can comprise RAM, ROM, EEPROM, CD-ROM, optical disk storage, magnetic disk storage or magnetic storage devices, flash memory or any other medium which can be used to store program code in the form of instructions or data structures which can be accessed by a computer.

Moreover, an arbitrary connection is referred to as a computer-readable medium, that is to say as a computer-readable transmission medium. For example, if instructions are transmitted from a website, a server or some other remote source via a connection, e.g. coaxial cable, fiber-optic cable, twisted pair, digital subscriber line (DSL), or wireless technology, e.g. infrared, radio and microwave, then such a connection is part of the definition of the medium.

By contrast, computer-readable storage media are directed at physical storage media, e.g. compact disk (CD), laser disk, optical disk, digital versatile disk (DVD), floppy disk, and Blu-ray disk. Storage media can be magnetic or optical storage media.

Computer-readable storage media can comprise combinations of the storage media above.

Instructions can be executed for example by one or more of the following components: a processor, a central processing unit (CPU), a digital signal processor (DSP), a microprocessor, an application-specific integrated circuit (ASIC), a field programmable logic array (FPGA), an integrated logic circuit, and/or a discrete logic circuit.

Accordingly, the term processor can relate to any of the above structures (including in combination) or any other structure suitable for the implementation.

In addition, the functionality described here can be provided in fixedly assigned hardware and/or software modules which are designed for coding and decoding, or integrated in a combined codec. Moreover, the techniques could be implemented completely in one or more circuits and/or logic elements.

The techniques can be implemented in a multiplicity of devices or apparatuses, including a wireless handheld device, an integrated circuit (IC) or a series of integrated circuits, for example including in a chipset. Various components, modules or units are mentioned, including for addressing functional aspects of devices, which are configured to implement the solutions described here but do not necessarily require a realization by way of different hardware units. Rather, various units can be combined in a single hardware unit or can be provided by a collection of inter-operative hardware units, including one or more processors, as described above, in conjunction with suitable software and/or firmware.

Although various exemplary embodiments have been disclosed, it is evident to a person skilled in the art that various changes and modifications can be made in order to attain the advantages of the solutions described here, without departing from the subject matter disclosed here. In particular, other components which perform the same functions can be used in a suitable manner.

It should be pointed out that features explained with reference to a specific figure can be combined with features of other figures, even in the cases in which this is not explicitly mentioned. Furthermore, the methods described can be realized either in software implementations by the use of suitable processor instructions or in hybrid implementations that use a combination of hardware and software. Such modifications of the solutions described here are covered by the accompanying claims.

What is claimed is:

1. An error correction method, comprising:

reading a bit group of n memory cells and determining n logical states therefrom, wherein the n states are determined in a time domain for a particular bit value for a $k_1$-out-of-n code and for a $k_2$-out-of-n code, where $k_1$ is less than $k_2$, and $k_1$ and $k_2$ are integers, for a read n-bit word corresponding to an n-bit non-code word having $k_2+1$ bits of the particular bit value, using the n logical states determined in the time domain for the $k_1$-out-of-n code to determine possible erroneous bits in the non-code word, determining possible code words of the $k_2$-out-of-n code for the non-code word based on the possible erroneous bits, and carrying out error correction using an external error code based on the possible code words.

2. The method as claimed in claim 1, in which the error correction using the external error code comprises selecting a byte sequence that is a code word of the external error code.

3. The method as claimed in claim 1, in which $k_2+1-k_1$ possible erroneous bits are determined.

4. The method as claimed in claim 1, in which code words of the $k_1$-out-of-n code and of the $k_2$-out-of-n code are code words of a multi-code.

5. The method as claimed in claim 1, in which $k_2$-$k_1$ is at least two.

6. The method as claimed in claim 1, further comprising:

using the n logical states determined in the time domain the $k_1$-out-of-n code to determine possible erroneous bits in the read n-bit non-code word by determining bit positions at which the non-code word differs from the n-bit code word corresponding to the n logical state determined in the time domain for the $k_1$-out-of-n code.

7. The method as claimed in claim 6, further comprising:

using the n-bit code word of the $k_1$-out-of-n code to determine possible erroneous bits in the n-bit non-code word by exclusively OR-ing the non-code word with the n-bit code word of the $k_1$-out-of-n code.

8. The method as claimed in claim 1, further comprising:

reading a bit group of n memory cells L times, determining possible code words of the $k_2$-out-of-n code for non-code words of the $k_2$-out-of-n code, forming combinations of L $k_2$-out-of-n code words for each non-code word, the number of combinations depending on the number of possible code words.

9. The method as claimed in claim 8, in which the following acts are carried out before reading:

transforming a code word of the external error code into code words of a second error code, wherein the second error code comprises code words of the $k_2$-out-of-n code, and storing the transformed code words.

10. The method as claimed in claim 9, in which the code word of the external error code comprises L K-bit bytes, is transformed into L code words of the second error code with n bits each, and these transformed L code words of the second error code are stored.

11. The method as claimed in claim 10, in which each of the combinations of L k2-out-of-n code words is transformed back into a byte sequence, in which that byte sequence which is a code word of the external error code is processed further.

12. The method as claimed in claim 1, in which the external error code is a Reed-Solomon code.

13. An error correction apparatus, comprising a memory, a code circuit arrangement configured to read a bit group of n memory cells from the memory, determine n logical states based on the bit group, wherein the n logical states are determined in a time domain for a particular bit value for a $k_1$-out-of-n code and for a $k_2$-out-of-n code, where $k_1$ is less than $k_2$, and $k_1$ and $k_2$ are integers, use the n logical states determined in the time domain for the $k_1$-out-of-n code to determine possible erroneous bits in an n-bit non-code word having $k_{2+1}$ bits of the particular bit value, determine possible code words of the $k_2$-out-of-n code for the non-code word based on the possible erroneous bits, perform error correction using an external error code based on the possible code words.

14. The error correction apparatus as claimed in claim 13 having a further code circuit arrangement configured to transform a code word of the external error code into code words of a second error code, wherein the second error code comprises code words of the $k_2$-out-of-n code, store the transformed code words in the memory.

15. The error correction apparatus as claimed in claim 13, $k_1-k_2$ is at least two.

16. The error correction apparatus as claimed in claim 13, in which the error correction using the external error code comprises selecting a byte sequence that is a code word of the external error code.

17. A non-transitory computer-readable medium having computer-executable instructions stored thereon that, when executed by a processor, cause the processor to perform corresponding operations, the operations, comprising:

reading a bit group of n memory cells and determining n logical states therefrom, wherein the n states are determined in a time domain for a particular bit value for a $k_1$-out-of-n code and for a $k_2$-out-of-n code, where $k_1$ is less than $k_2$, and $k_1$ and $k_2$ are integers, for a read n-bit word-corresponding to an n-bit non-code word having $k_{2+1}$ bits of the particular bit value, using the n logical states determined in the time domain for the $k_1$-out-of-n code to determine possible erroneous bits in the non-code word, determining possible code words of the $k_2$-out-of-n code for the non-code word based on the possible erroneous bits, and carrying out error correction using an external error code based on the possible code words.

18. The non-transitory computer-readable medium of claim 17, wherein the error correction using the external error code comprises selecting a byte sequence that is a code word of the external error code.

19. The non-transitory computer-readable medium of claim 17, wherein $k_2+1-k_1$ possible erroneous bits are determined.

20. The non-transitory computer-readable medium of claim 17, wherein code words of the $k_1$-out-of-n code and of the $k_2$-out-of-n code are code words of a multi-code.

21. The non-transitory computer-readable medium of claim 17, wherein $k_2-k_1$-is at least two.

22. The non-transitory computer-readable medium of claim 17, the operations further comprising:

using the n logical states determined in the time domain the $k_1$-out-of-n code to determine possible erroneous bits in the n-bit non-code word by determining bit positions at which the non-code word differs from the n-bit code word corresponding to the n logical state determined in the time domain for the $k_1$-out-of-n code.

23. The non-transitory computer-readable medium of claim 22, the operations further comprising:

using the n-bit code word of the $k_1$-out-of-n code to determine possible erroneous bits in the n-bit non-code word by exclusively OR-ing the non-code word with the n-bit code word of the $k_1$-out-of-n code.

24. The non-transitory computer-readable medium of claim 17, the operations further comprising:

reading a bit group of n memory cells L times, determining possible code words of the $k_2$-out-of-n code for non-code words of the $k_2$-out-of-n code, forming combinations of L $k_2$-out-of-n code words for each non-code word, the number of combinations depending on the number of possible code words.

* * * * *